United States Patent
Asano et al.

(10) Patent No.: US 7,107,376 B2
(45) Date of Patent: Sep. 12, 2006

(54) SYSTEMS AND METHODS FOR BANDWIDTH SHAPING

(75) Inventors: Shigehiro Asano, Austin, TX (US); Peichun Peter Liu, Austin, TX (US); David Mui, Round Rock, TX (US)

(73) Assignees: International Business Machines Corp., Armonk, NY (US); Toshiba America Electronic Components, Inc., Irvine, CA (US)

( * ) Notice: Subject to any disclaimer, the term of this patent is extended or adjusted under 35 U.S.C. 154(b) by 227 days.

(21) Appl. No.: 10/764,626

(22) Filed: Jan. 26, 2004

(65) Prior Publication Data

US 2005/0165987 A1    Jul. 28, 2005

(51) Int. Cl.
*G06F 13/362* (2006.01)
*G06F 13/372* (2006.01)

(52) U.S. Cl. .................. 710/117; 710/116; 710/113; 710/123; 710/124

(58) Field of Classification Search .................. None
See application file for complete search history.

(56) References Cited

U.S. PATENT DOCUMENTS

| | | | | |
|---|---|---|---|---|
| 5,430,848 A | * | 7/1995 | Waggener | .................. 710/123 |
| 5,596,576 A | * | 1/1997 | Milito | .................. 370/450 |
| 5,623,672 A | * | 4/1997 | Popat | .................. 710/240 |
| 5,996,037 A | * | 11/1999 | Emnett | .................. 710/117 |
| 6,092,137 A | * | 7/2000 | Huang et al. | .................. 710/111 |
| 6,359,884 B1 | | 3/2002 | Vincent | |

* cited by examiner

*Primary Examiner*—Rehana Perveen
*Assistant Examiner*—Jeremy S. Cerullo
(74) *Attorney, Agent, or Firm*—DLA Piper Rudnick Gray Cary US LLP (57) ABSTRACT

Systems and methods for controlling access by a set of agents to a resource, where the agents have corresponding priorities associated with them, and where a monitor associated with the resource controls accesses by the agents to the resource based on the priorities. One embodiment is implemented in a computer system having multiple processors that are connected to a processor bus. The processor bus includes a shaping monitor configured to control access by the processors to the bus. The shaping monitor attempts to distribute the accesses from each of the processors throughout a base period according to priorities assigned to the processors. The shaping monitor allocates slots to the processors in accordance with their relative priorities. Priorities are initially assigned according to the respective bandwidth needs of the processors, but may be modified based upon comparisons of actual to expected accesses to the bus.

31 Claims, 5 Drawing Sheets

SYSTEMS AND METHODS FOR BANDWIDTH SHAPING

BACKGROUND OF THE INVENTION

1. Field of the Invention

The invention relates generally to data processing systems and methods and more particularly to systems and methods for controlling the manner in which multiple agents such as computer processors access a resource such as a communication bus in order to improve the distribution of accesses by the various agents and to thereby reduce congestion and delays related to accessing the resource.

2. Related Art

Computer systems are becoming increasingly powerful, and are used not only for scientific and business purposes, but also for entertainment purposes. For instance, some computer systems are used with multimedia applications to present information to a user in the form of sounds, music, still images, video images, and the like. Some computer systems are optimized for these multimedia applications and, in fact, some computer systems are designed exclusively for multimedia applications such as games.

Computer systems that are designed to execute multimedia game applications and other multimedia applications often make use of more than a single processor. These systems may have multiple processors, where one or more of the processors can be dedicated to performing different types of functions. For example, one processor may handle mathematical computations or control functions, while another processor handles video generation and yet another processor handles sound generation. The separation of the responsibilities assigned to each of the processors (or groups of processors) allows the processors to be optimized for that particular types of the functions for which they are responsible. The different processors are typically interconnected and operate interactively to coordinate the different functions of the system.

Typically, the different processors that are operable in a multimedia game system are each connected to a common bus. This bus enables the common control on the processors to coordinate their activities and also enables the exchange of data between them. Additionally, the bus provides a means for communication of the outputs of the different processors to the appropriate output devices. Because of the many functions that must be performed by the multiple processors, there is a great deal of information that is communicated by this bus. Because there may be periods during which many of the processors may be attempting to access the bus to communicate commands or other data to various other parts of the system, there is potential for congestion on the bus. In other words, the processors may attempt to communicate an amount of information on the bus that exceeds the capacity of the bus.

There is therefore a need to implement a mechanism to prevent congestion on the bus. Conventionally, access to the bus by the various processors has been controlled by putting a hard limit on accesses to the bus by each of the processors. For example, there might be four processors coupled to the bus. Each of the processors would be allowed a predetermined number of accesses to the bus (e.g., commands issued to the bus) in a given period. For each processor, once at the number of accesses reached the predetermined number, that processor with no longer be allowed to access the bus.

This mechanism for controlling access to the bus, however, is not ideal for a number of reasons. One of these reasons is that the pattern of accesses by the different processors may be irregular. This may be problematic because, in multimedia systems, it may be necessary to provide access and a more regular fashion in order to enable the processors to meet the real-time demands of the multimedia application that is being executed. This problem may be illustrated by an example.

Figure 1:
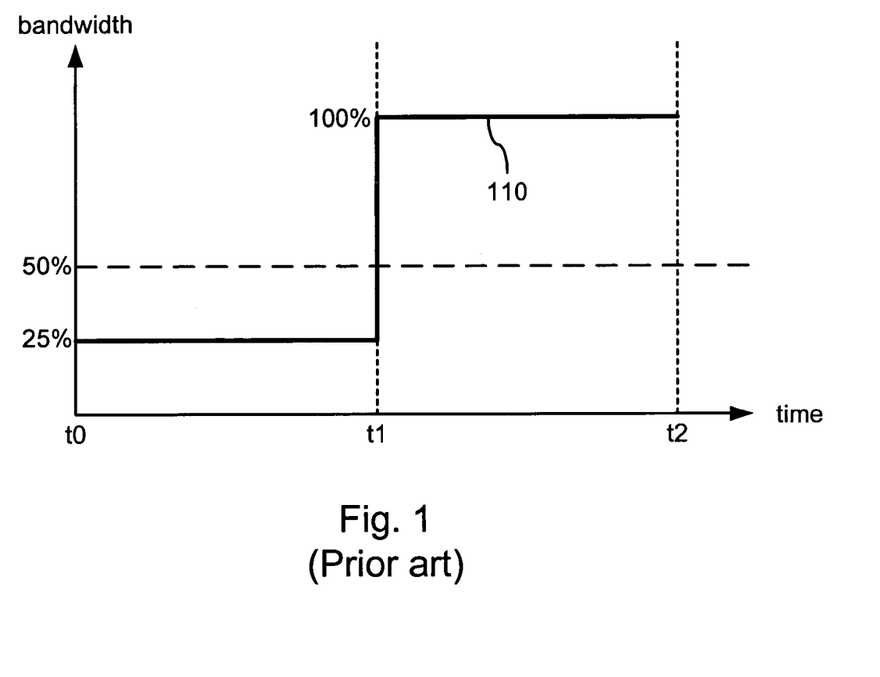
FIG. 1 is a graph illustrating the bandwidth utilized by a particular processor in a typical prior art multiprocessor system.

Referring to FIG. 1, a graph illustrating the bandwidth utilized by a particular processor is shown. It is assumed for the purposes of this figure that there are four processors, each of which is allowed to access the bus in a round robin fashion until it reaches its allocated number of accesses. It is further assumed that the processor for which the bandwidth usage is graphed in FIG. 1 (processor A) needs 50 percent of the bus's bandwidth.

As indicated above, the bus accesses for processor A are shown in the figure (as curve 110). Initially (between time t0 and t1), none of the processors has reached its predetermined allocation and therefore all four processors take turns accessing the bus. Processor A therefore gets 25 percent of the bandwidth. At time t1, three of the processors reached their allocations and are therefore prohibited from accessing the bus for the remainder of the period (i.e., until time t2). Thus, only processor A is allowed to access the bus during the period from time t1 to t2. As noted above, this may cause problems, in that processor A may need more than 25% of the bus bandwidth during the period from t0 to t1, and the other processors may need more than 0% of the bandwidth during the period from t1 to t2, in order to meet the real-time requirements for each of the processors.

SUMMARY OF THE INVENTION

One or more of the problems outlined above may be solved by the various embodiments of the invention. Broadly speaking, the invention includes systems and methods for controlling access by a set of agents to a resource, where the agents have corresponding priorities associated with them, and where a monitor associated with the resource controls accesses by the agents to the resource based on the priorities. In one embodiment, the priorities may be modified to adapt the control implemented by the monitor to achieve a more optimal distribution of access among the agents.

One embodiment of the invention comprises a method for controlling access by a plurality of agents to a resource, including the steps of identifying a priority associated with each of a plurality of agents and enabling each agent to access a resource according to the priority associated with the agent.

Another alternative embodiment of the invention comprises a system having logic configured to be coupled to a resource, where the logic is configured to identify a priority for each of a plurality of agents and to enable access to the resource for each agent in accordance with the corresponding priority.

Another alternative embodiment of the invention is a software product comprising a computer readable medium containing one or more instructions configured to cause a computer to perform a method including the steps of identifying a priority associated with each of a plurality of agents and enabling each agent to access a resource according to the priority associated with the agent.

Numerous additional embodiments are also possible.

The various embodiments of the present invention may provide a number of advantages over the prior art. For example, with respect to the embodiment described above, processors which have greater bandwidth requirements are provided greater access to the bus throughout the base period, rather than having relatively little access early in the base period and then having much greater access later in the base period. The processors' access to the bus is therefore more evenly distributed and results in less congestion and burstiness on the bus. Similar advantages may be provided in other embodiments involving other types of agents and resources.

BRIEF DESCRIPTION OF THE DRAWINGS

Other objects and advantages of the invention may become apparent upon reading the following detailed description and upon reference to the accompanying drawings.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION

One or more embodiments of the invention are described below. It should be noted that these and any other embodiments described below are exemplary and are intended to be illustrative of the invention rather than limiting.

Broadly speaking, the invention comprises systems and methods for controlling access by a set of agents to a resource, where the agents have corresponding priorities associated with them, and where a monitor associated with the resource controls accesses by the agents to the resource based on the priorities. In one embodiment, the priorities may be modified to adapt the control implemented by the monitor to achieve a more optimal distribution of access among the agents.

While the invention is widely applicable to different types of systems, it is impossible to include all of the possible embodiments and contexts of the invention in this disclosure. The present disclosure therefore focuses on a few exemplary embodiments that are implemented in multiprocessor computing systems. It should be noted that these embodiments are intended to be illustrative rather than limiting. Upon reading this disclosure, many alternative embodiments of the present invention will be apparent to persons of ordinary skill in the art. All these alternative embodiments are within the scope of the appended claims.

One embodiment of the present invention is implemented in a multiprocessor computer system. This system includes a set of processors that are configured to perform a variety of different multimedia tasks. Each of the processors is connected to a processor bus that is used to communicate information between the processors and to/from other parts of the computer system. The processor bus includes a shaping monitor which is configured to control access by each of the processors to the processor bus.

In this embodiment, the shaping monitor is configured to attempt to distribute the command accesses from each of the processors relatively evenly throughout a base period. The shaping monitor allocates time slots to the processors in accordance with priorities that are assigned to the respective processors. If a processor has a higher priority, more slots are allocated to the processor. If a processor has a lower priority, less slots are allocated to the processor. The shaping monitor may determine a repeating pattern defining the slots which are assigned to the different processors.

In this embodiment, the priorities associated with the processors are initially assigned according to the respective bandwidth needs or requests of the processors. The priorities associated with the different processors may, however, be modified. In one embodiment, the shaping monitor determines the number of commands issued to the bus by each processor and compares this number to an expected number. If the actual number of commands issued to the bus is less than expected, the priority associated with the processor is increased. If the actual number of commands issued to the bus is greater than expected, the priority associated with the processor is decreased. These changes to the processor's priority tend to drive the actual number of commands toward the expected number.

An alternative embodiment of the invention comprises a method for controlling access by a plurality of agents to a resource, including the steps of identifying a priority associated with each of a plurality of agents and enabling each agent to access a resource according to the priority associated with the agent. In one embodiment, the agents comprise processors in a multiprocessor computing system and the resource comprises a bus interconnecting the processors. In this embodiment, enabling the agents to access the resource comprises defining a set of time slots and assigning the processors to the time slots according to a repeating pattern based upon the priorities associated with the processors. In one embodiment, the method may also include the steps of determining for each processor whether an actual number of accesses by the processor to the bus is greater than or less than an expected number of accesses by the processor to the bus, and decreasing the priority associated with the processor if the actual number of accesses is greater than the expected number of accesses, and increasing the priority associated with the processor if the actual number of accesses is less than the expected number of accesses. In one embodiment, the priority associated with each agent is initially set to a value proportional to a bandwidth request associated with the agent. In one embodiment, the method further comprises maintaining at least one base counter configured to decrement from a base counter start value based upon accesses to the resource, maintaining for each agent a rate counter configured to decrement from a rate counter start value based upon accesses by the agent and allowing each agent to access the resource only if the corresponding rate counter is non-zero.

Another alternative embodiment of the invention comprises a system having logic configured to be coupled to a resource, where the logic is configured to identify a priority for each of a plurality of agents and to enable access to the resource for each agent in accordance with the corresponding priority. In one embodiment, the agents comprise processors in a multiprocessor computing system and the resource comprises a bus to which the processors are coupled. In this embodiment, the logic is configured to enable access to the bus by defining a set of time slots and assigning the processors to the time slots according to a repeating pattern based upon the priorities associated with the processors. In one embodiment, the logic is configured to: determine for each processor whether an actual number of accesses by the processor to the bus is greater than or less than an expected number of accesses by the processor to the bus and decrease the priority associated with the processor if the actual number of accesses is greater than the expected number of accesses, and increase the priority associated with the processor if the actual number of accesses is less than the expected number of accesses. In one embodiment, the system further comprises at least one base counter configured to decrement from a base counter start value based upon accesses to the resource and a rate counter for each agent configured to decrement from a rate counter start value based upon accesses by the agent. In this embodiment, the logic is configured to allow each agent to access the resource only if the corresponding rate counter is non-zero.

Another alternative embodiment of the invention is a software product comprising a computer readable medium containing one or more instructions configured to cause a computer to perform a method including the steps of identifying a priority associated with each of a plurality of agents and enabling each agent to access a resource according to the priority associated with the agent. In one embodiment, the software product is configured to be executed in a multiprocessor computing system. In this embodiment, the agents comprise processors and the resource comprises a bus interconnecting the processors. In this embodiment, the software product is configured to enable the agents to access the resource by defining a set of time slots and assigning the processors to the time slots according to a repeating pattern based upon the priorities associated with the processors. In one embodiment, the software product may be configured to include the steps of determining for each processor whether an actual number of accesses by the processor to the bus is greater than or less than an expected number of accesses by the processor to the bus, and decreasing the priority associated with the processor if the actual number of accesses is greater than the expected number of accesses, and increasing the priority associated with the processor if the actual number of accesses is less than the expected number of accesses. In one embodiment, the software product is configured to initially set the priority associated with each agent to a value proportional to a bandwidth request associated with the agent. In one embodiment, the software product is configured to maintain at least one base counter configured to decrement from a base counter start value based upon accesses to the resource, to maintain for each agent a rate counter configured to decrement from a rate counter start value based upon accesses by the agent and to allow each agent to access the resource only if the corresponding rate counter is non-zero.

As noted above, the multiprocessor systems described herein provide a context for specific embodiments of the invention. Just as these embodiments are illustrative rather than limiting of the invention, the particular terminology used in connection with these embodiments should be considered illustrative rather than limiting. For example, while some embodiments involve control of processors' access to a bus, these terms (e.g., processor, command, bus) are illustrative of more generic terms (e.g., agent, access, resource) that are used elsewhere in the disclosure and in the claims.

The various embodiments of the present invention may provide a number of advantages over the prior art.

For example, with respect to the embodiment described above, processors which have greater bandwidth requirements are provided greater access to the bus throughout the base period, rather than having relatively little access early in the base period and then having much greater access later in the base period. The processors' access to the bus is therefore more evenly distributed and results in less congestion and burstiness on the bus. Similar advantages may be provided in other embodiments involving other types of agents and resources.

Figure 2:
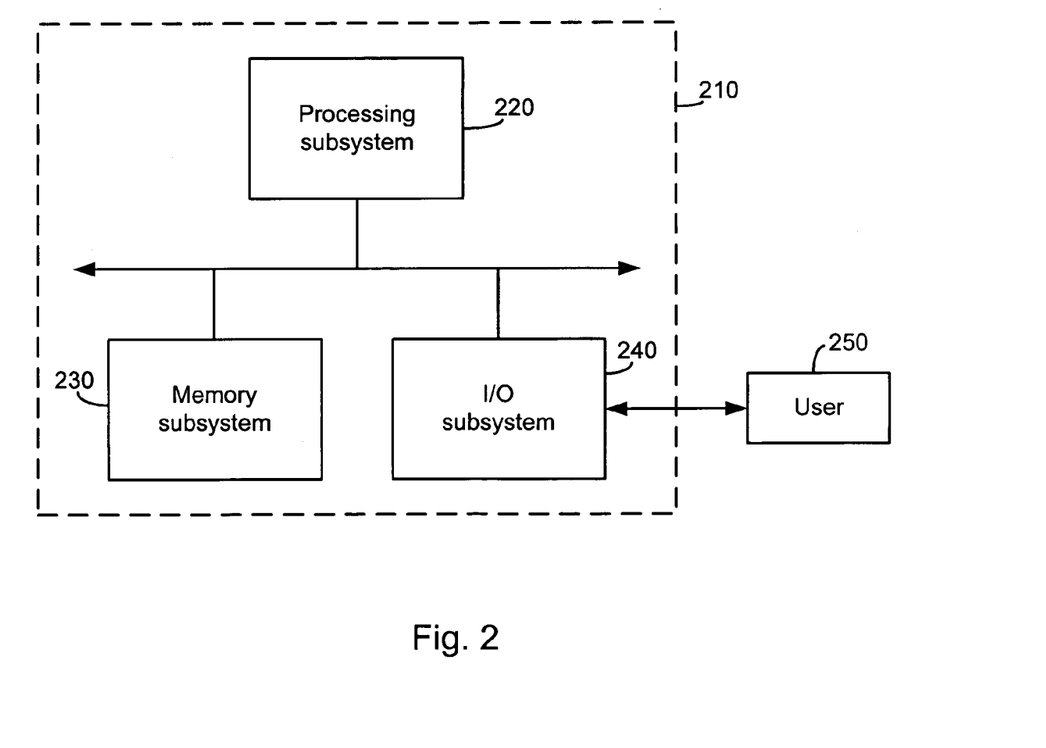
FIG. 2 is a functional block diagram illustrating the components of a computer system in accordance with one embodiment.

Referring to FIG. 2, a functional block diagram illustrating the components of a computer system in accordance with one embodiment is shown. A computer system 210 includes a processing subsystem 220, a memory subsystem 230 and an input/output (I/O) subsystem 240. A user 250 interacts with computer subsystem 210 and output is presented to the user via I/O subsystem 240.

Figure 3:
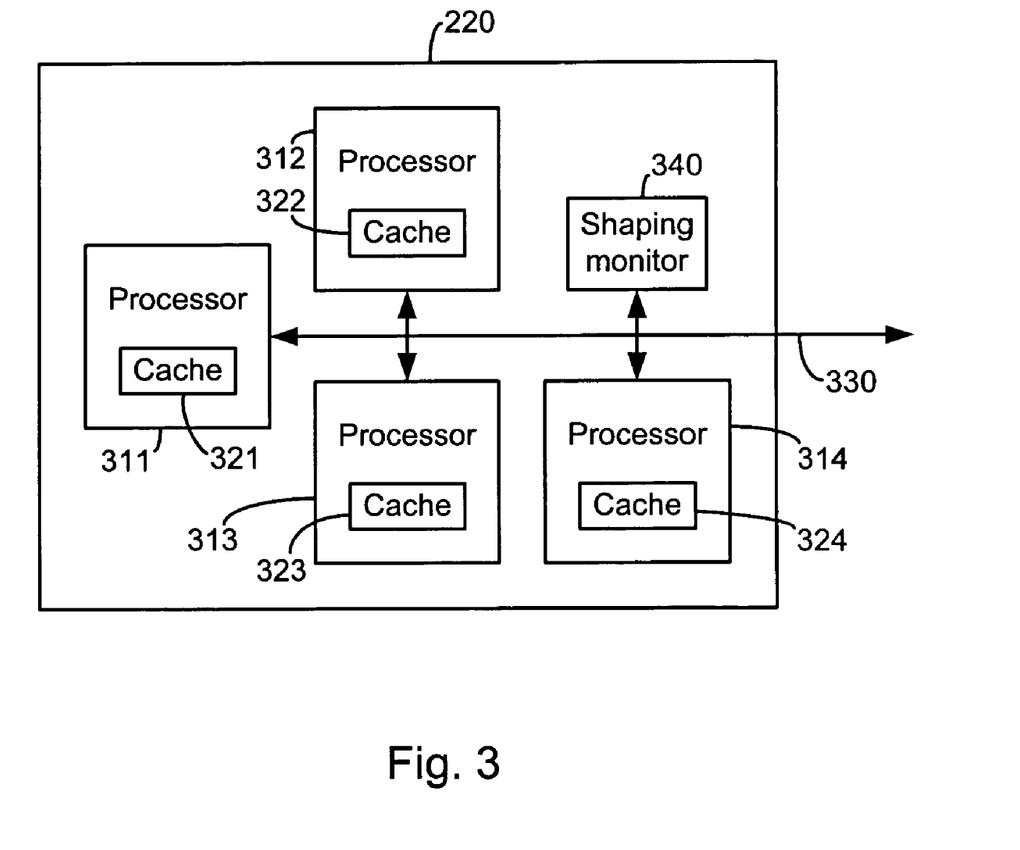
FIG. 3 is a functional block diagram illustrating the components of a processing subsystem in accordance with one embodiment.

Referring to FIG. 3, a functional block diagram illustrating the components of a processing subsystem 220 in accordance with one embodiment is shown. In this embodiment, processing subsystem 220 is a multiprocessor subsystem that includes multiple individual processors 311–314. Each of processors 311–314 includes a cache memory 321–324.

Cache memories 321–324 as shown in FIG. 3 illustrate that processors 311–314 may include components in addition to the processors alone. Cache memories 321–324 are merely exemplary, and components other than cache memories may also be incorporated into the physical processor devices. It should also be noted that, while processors 311–314 are identically depicted in the figure, the processors, their respective configurations, their incorporated subcomponents, and the like may be the same, or they may differ. In other words, the processors may be homogeneous or heterogeneous.

Processors 311–314 are each coupled to a processing subsystem bus 330. Processing subsystem bus 330 enables processors 311–314 to communicate with each other, as well as with other components of the computer system, such as non-cache memory, I/O components, and the like. Access to processing subsystem bus 330 is controlled by a shaping monitor 340.

While shaping monitor 340 is depicted as a separate component in the functional block diagram of FIG. 3, it should be noted that the shaping monitor may be implemented in various different ways. For example, shaping monitor 340 may be implemented as hardware, software, firmware or any combination thereof. As hardware, shaping monitor 340 may comprise a separate logic circuit coupled to bus 330, or it may be incorporated into bus 330 itself. Software implementations of shaping monitor 340 executed in a special-purpose processor or in one of processors 311–314. It should be noted that software code embodied in a computer-readable medium and configured to operate in accordance with this disclosure is itself considered to be an alternative embodiment of the invention. It should also be noted that shaping monitor may be implemented as a distributed subsystem. For example, in one embodiment, each processor may have a corresponding shaping monitor component that performs bandwidth shaping functions for that processor. Still other variations may also be possible.

Persons of skill in the art of the invention will appreciate that the structures depicted in the FIGS. 2 and 3 are illustrative and that other embodiments may use alternative configurations. For example, processors 311–314 may be general-purpose microprocessors, digital signal processors (DSPs), special-purpose processors, or other types of processors. Further, the processors may or may not include cache memories or other integral components as described above. The scope of the claims appended hereto are therefore not limited to the particular configurations described herein.

Figure 4:
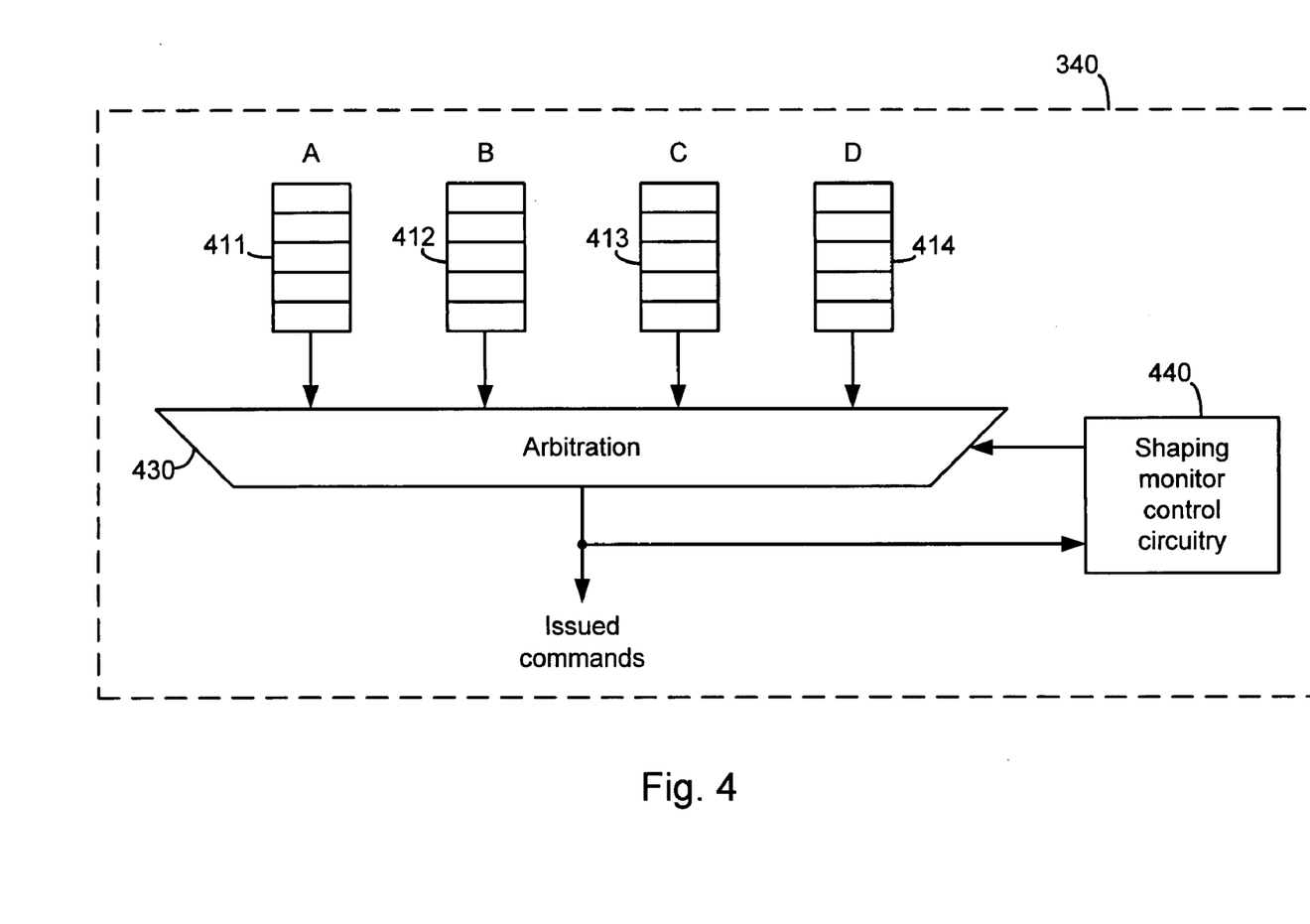
FIG. 4 is a diagram illustrating a shaping mechanism in accordance with one embodiment.

Referring to FIG. 4, a diagram illustrating a shaping mechanism using shaping monitor 340 in accordance with one embodiment is shown. In this embodiment, commands from processors 311–314 are placed in queues 411–414. For example, commands from processor 311 may be placed in queue 411, while commands from processor 312 may be placed in queue 412, and so on. Commands in queue 411 are identified in the figure as "A" commands, while commands in queues 412–414 are identified in the figure as "B"–"D" commands, respectively. It should be noted that, in this embodiment, the commands in a particular queue correspond to a single processor, other embodiments may differ. For instance, in one alternative embodiment, each processor may generate commands in multiple classes, and the commands in a particular queue may correspond to a single class, but not a single processor.

Shaping monitor control circuit 440 controls multiplexer 430 to determine which of queues 411–414 is selected to provide the next command to the bus. Shaping monitor control circuit 440 thereby controls the number of commands issued from each processor, hence the bus bandwidth used by each processor (thereby implementing the shaping mechanism).

In one embodiment, shaping monitor control circuit 440 maintains a pair of counters for each processor. One of the counters is a rate counter and the other is a base counter. The base counter for each processor measures a time frame, and is the same for each processor in this embodiment. Shaping monitor control circuit 440 may use a single base counter that is common to all of the processors, or a separate base counter for each processor. The base counters count down from a predetermined start value corresponding to the time frame. The start value is modifiable by the shaping monitor control circuit 440.

The rate counter for each processor counts the number of commands issued to the bus by the processor. The rate counter for each processor counts down from a value that is set for that processor. The value is based, in one embodiment, upon a bandwidth allocation for the processor. For example, if the base counter has a start value of 255, and a particular processor has a bandwidth allocation of 50%, the start value for the rate counter would be 50% of the base counter start value, or 127. While 127 is not exactly half of 255, the counters actually count from their respective start values to 0, instead of 1. Consequently, for a counter that has a start value of n, there are actually n+1 values of the counter. Therefore, a counter having a start value of 127 will decrement through half as many values as a counter having a start value of 255. As a result, for the purposes of this disclosure, a start value of 127 will be considered half of a start value of 255. The start values from which the rate counters count down are modifiable by the shaping monitor 340.

The base and rate counters limit the number of commands that can be issued by a processor. The base counter is initially loaded with its start value. As commands are issued to the bus (from any processor), the base counter is decremented. The rate counter is initially loaded with its own start value. As commands are issued from the corresponding processor to the bus, the rate counter is decremented. When the rate counter reaches 0, no more commands can be issued from the corresponding processor until the base counter reaches 0 and the base and rate counters are subsequently reset.

In one embodiment, the shaping monitor 340 is configured to set the start value for the rate counter to a value roughly proportional to a bandwidth allocation. For example, assume the base counter start value is 255. If processor 311 needs 50% of the bus bandwidth, processors 312 and 313 need 25% each, and processor 314 needs 0%, the rate counter start value for processor 311 will be 127, the rate counter start value for processors 312 and 313 will be 63, and the rate counter start value for processor 314 will be 0. Then, as the base counter counts down from 255 (the base counter is decremented by one for each command issued to the bus), the rate counters will count down from their respective start values. It should be noted that each rate counter will be decremented only when a command for the corresponding processor is issued to the bus.

In one embodiment, the shaping monitor 340 is configured to attempt to evenly distribute the command accesses from each of the processors throughout the base period (the period during which the base counter decrements from its start value to 0) by allocating slots to the processors in accordance with priorities that are assigned to the respective processors. In one embodiment, the priorities are assigned according to the respective bandwidth needs of the processors. If one processor needs twice as much bandwidth as another, the first processor has a priority that is twice as high as the priority of the second.

The bandwidth needs of each processor are determined in one embodiment in accordance with the bandwidth requests made by the respective processors. The bandwidth requests of the processors may be made, for example, in terms of percentages of the total bandwidth of the bus (e.g., processor 311 requests 50% of the bus bandwidth). Alternatively, the requests may be for a particular amount of bandwidth (e.g., n bits per second), or for a particular number of accesses (e.g., n commands per second). The bandwidth requests may also be stated in terms of the respective types of functions handled by the processors. In this instance, the shaping monitor could determine the bandwidth needs of the respective processors based on the functional types. For example, video processors might need a particular minimum amount of bandwidth in order to avoid delays that could cause noticeable video artifacts. Audio processors might also need a similar minimum amount of bandwidth in order to avoid audio artifacts, but might be assigned lower priority than video processors because video delay artifacts might be considered less desirable than audio delay artifacts. Many other variations are also possible as well.

The shaping monitor in this embodiment then sets the priorities of the processors based upon the bandwidth requests of the different processors. In one embodiment, the priorities are set to values that are proportional to the requested bandwidths. Alternatively, the priorities may be set to values that simply indicate the order of priority. In yet another embodiment, the priorities may be set to reflect the different functionalities of the processors. In other alternative embodiments, the priority may be implemented in still other ways.

Based upon the priorities associated with the processors, the shaping monitor 340 determines a pattern defining the order in which the processors' accesses will be allowed (e.g., how the processors' commands will be forwarded to the bus). Based upon the example above in which processors 311–314 need 50%, 25%, 25% and 0%, respectively, the shaping monitor 340 may allow bus accesses in the following order: A, A, B, C, A, A, B, C, . . . , where "A" corresponds to processor 311, "B" corresponds to processor 312, "C" corresponds to processor 313, and "D" corresponds to processor 314. Thus, out of every four commands issued to the bus, two will be from processor 311, and one each will be from processors 312 and 313.

In this example, the priorities associated with the different processors are conveniently assumed to be multiples of 25%. The priorities, however, are not limited to such convenient multiples. In this case, determining the appropriate pattern of accesses may be handled in various ways. For instance, in one embodiment, the shaping monitor 340 may be configured to identify a least common denominator for the priorities and to determine the pattern based upon the least common denominator. Considering the example of a set of four processors, 311–314 which have respective priorities of 33%, 33%, 22% and 11%, the least common denominator is 11%. The shaping monitor 340 may therefore define the pattern of accesses by processors 311–314 to be a nine time slot pattern of A, A, A, B, B, B, C, C, D. The shaping monitor 340 may also distribute the accesses by the different processors throughout the pattern. The shaping monitor 340 may therefore generate a pattern of A, B, C, A, B, C, A, B, D in this example.

If the relative priorities of the processors are not multiples of each other, or if they are very large multiples (e.g., requiring tens or hundreds of timeslots), it may be convenient to round the priorities to more convenient values for the purposes of the pattern computation. For example, if the processors have priorities of 51%, 23%, 24% and 2%, rounded values of 50%, 25%, 25% and 0% may be used to determine the pattern. It may be desirable in this instance to make periodic adjustments to the pattern to account for the rounding of the priorities. For example, a pattern of A, A, B, C may be periodically interrupted by a pattern of A, B, C, D.

The foregoing patterns of commands focus on embodiments in which bandwidth is allocated by the shaping monitor on a per-processor basis. In other words, all commands from a particular processor are handled within the bandwidth allocation for that processor. As noted above, however, the processors may each issue different classes of commands, so the shaping monitor may establish a pattern of commands that reflects the different classes.

For example, in one embodiment, each processor may have a corresponding component of the shaping monitor subsystem. A first processor (processor 0) may request 10% bandwidth for a class of commands A0 and 10% for class B0. The corresponding shaping monitor component may therefore request a pattern A0,B0,N,N,N,N,N,N,N,N, where N represents a non-requested slot. A second processor (processor 1) may request 20% for class A1 and 30% for class B1. The shaping monitor component for this processor may therefore request a pattern of A1,A1,B1,B1,B1,N,N,N, N,N. The shaping monitor system may combine these in various ways, depending upon priorities and the like. In one embodiment, the shaping monitor may combine the requests to arrive at a pattern such as A1,A0,A1,B0,B1,B1,B1,N,N, N. In this instance, the bandwidth is not all assigned. In an alternative embodiment, the unassigned slots may be eliminated in order to utilize all of the bandwidth.

Many other variations on the foregoing methods for determining access patterns may be used in alternative embodiments. These variations will be readily apparent to persons of ordinary skill in the art of the invention.

By contrast to the foregoing embodiment of the invention, conventional shaping mechanisms generally would not unevenly distribute the processor commands issued to the bus. Instead, the commands would typically be issued in a round-robin fashion: A, B, C, D, . . . As a result, processor 311 would initially have too little bandwidth (it would have the same bandwidth as processors 312 and 313). Processors 312 and 313 would then quickly reach their allocations and would not be able to issue any further commands until the next base period. After processors 312 and 313 reached their allocations, processor 311 would have plenty of bandwidth, but processors 312 and 313 would have none. This is illustrated in FIG. 1. Further, the slot assigned to processor 314 might well go unused, so the corresponding bandwidth might be entirely wasted.

In the embodiment of the invention described above, the shaping monitor 340 allows processor commands to be passed to the bus in accordance with the access pattern that is defined based upon the priorities associated with the processors. In one embodiment, if a processor does not have a command to issue to the bus in its designated timeslot, the shaping monitor 340 may be configured to detect that no command is available and may issue another command in that timeslot to replace the absent command. The replacement command may be selected in a variety of ways. For instance, the command may be selected from the queue that has a large number of commands in it. Alternatively, the command may be selected from a queue corresponding to a processor that is allocated "best-effort" bandwidth. That is, the processor is not guaranteed any bandwidth, but if bandwidth becomes available, it can be used to issue this processor's commands. Still other variations may also be possible.

As noted above, it is possible to modify the start values of the rate counters. In one embodiment, the start values of the rate counters may be adjusted based on the number of commands actually issued to the bus, as compared to the number of commands that were expected to be issued. In this embodiment, the difference between the actual and expected numbers of commands issued to the bus for a particular processor is determined. Then, if the number of commands that were actually issued exceeds the number expected to be issued, the priority associated with the processor is decreased. If, on the other hand, the number of commands that were actually issued is less than the number expected to be issued, the priority associated with the processor is increased.

This method for adjustment of the priorities of the different processors may be implemented in the following manner. It is assumed that the base period is b. That is, over the interval b, the base counter will count down from its start value to 0. The expected number of commands to be issued by a processor is a. During an interval e, i commands are issued to the bus from the processor. Then, it can be determined whether the processors commands are being issued to the bus at the expected rate by comparing i/e (the number of commands actually issued per interval e) to a/b (the number of commands expected to be issued per interval b). Thus, if i/e−a/b is less than 0, commands from the processor are being issued to the bus more slowly than expected, and the priority associated with the processor is increased. If i/e−a/b is greater than 0, commands from the processor are being issued to the bus more often than expected, and the priority associated with the processor is decreased.

While the comparison of i/e to a/b is very straightforward, it may be very costly, in terms of the required hardware logic, to implement this comparison in a straightforward manner. This comparison can be modified, however, to simplify the corresponding hardware implementation. First, the mathematical expression corresponding to the comparison must be simplified.

As noted above, the expression $$i/e-a/b$$

provides a starting point. The evaluation of this expression provides a value which, if positive, causes the processor's priority to be decreased and, if negative, causes the processor's priority to be increased.

Because division of one value by another is a relatively complex operation requiring correspondingly complex logic, it would be desirable to eliminate or simplify this portion of the expression. Similarly, multiplication of millions is relatively complex and requires corresponding complex logic they should be reduced or eliminated.

If the initial expression is multiplied by e, the expression becomes $$i-ae/b$$

If b is selected as a multiple of 2, the division of ae by b can be accomplished by simply shifting the value of ae in a register. Since e represents the interval over which commands have been issued and may be implemented as an incrementing counter, the product ae can be obtained by simply adding a to e every time e is incremented.

Figure 5:
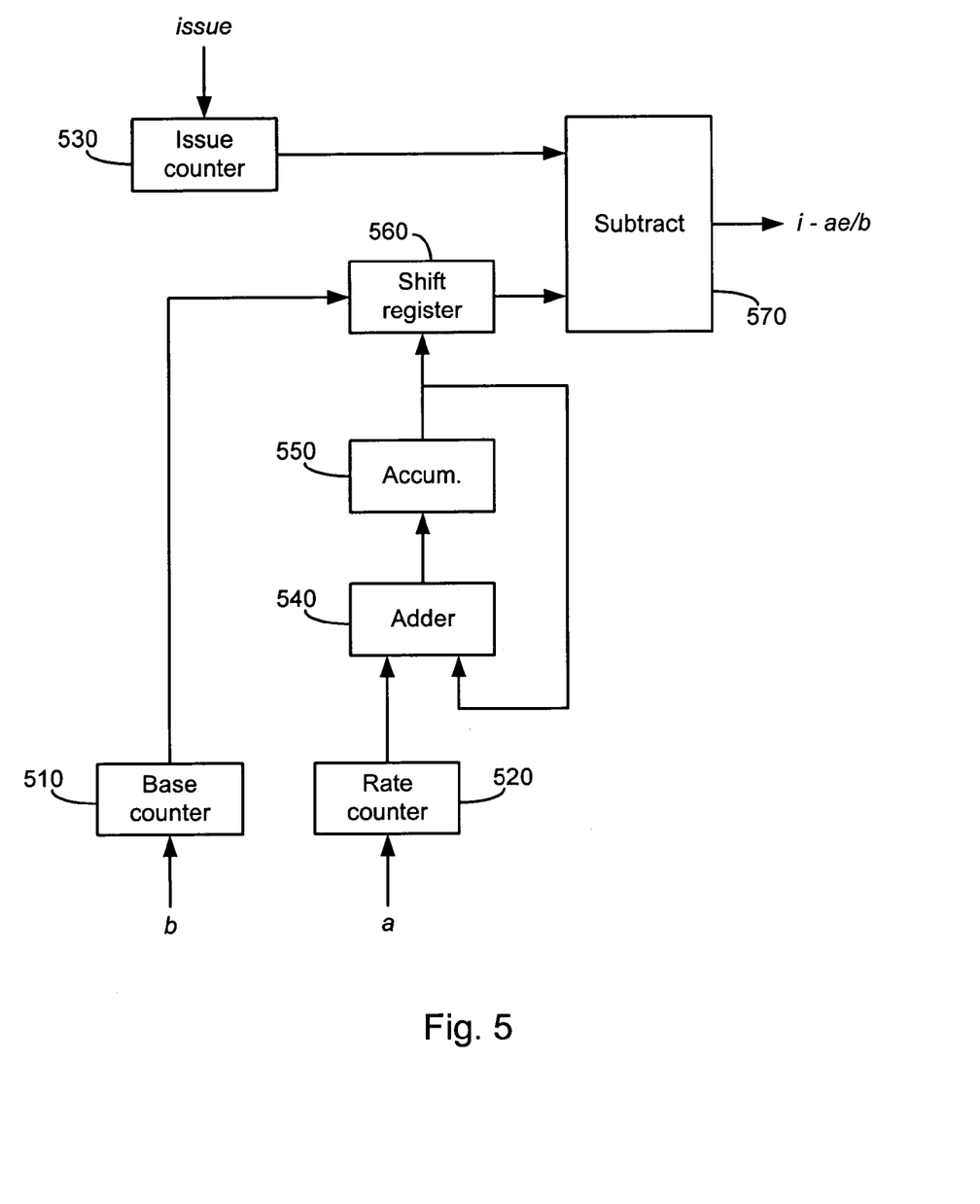
FIG. 5 is a functional block diagram illustrating the hardware necessary in accordance with one embodiment to evaluate an expression upon which priority modifications are based.

Then, the simplified expression can be implemented in hardware as shown in FIG. 5.

Referring to FIG. 5, a functional block diagram illustrating the hardware (or firmware or software) components necessary to implement the expression i−ae/b in accordance with one embodiment is shown. In this embodiment, the hardware shown in FIG. 5 corresponds to a single processor. It should be noted that, while b and e are described above as time intervals, the corresponding intervals can be equivalently measured in terms of commands issued to the bus. In other words, base period b can be measured as the number of commands that will be issued in the base period, rather than as a specific time interval. Similarly, elapsed interval e can be measured as the number of commands issued from the start of the base period.

As depicted in FIG. 5, the start value b for the base counter is stored in a register 510. Similarly, the start value a is stored in a register 520.

Whenever a command from the processor is issued to the bus, a counter 530 is incremented. The value stored in counter 530 therefore represents i, the number of commands issued to the bus in the current interval.

The value of ae is computed by adder 540 and accumulator 550. Every time a command is issued to the bus from any processor, adder 540 adds the rate counter start value a to the current value in accumulator 550. At the beginning of the base period, accumulator 550 is reset to 0, so it effectively acts as a counter that is incremented by a every time e is incremented. In other words, at reset, e is 0 and the value in accumulator 550 (ae) is 0. After one command is issued to the bus, e is 1 and ae is equal to a.

After n commands are issued, e is equal to n and ae is equal to an.

The output of accumulator 550 is input to shift register 560. This value (ae) is then shifted by a number of bits, m, where b is equal to 2 to the power m, minus 1. Thus, if b is 255, m is 8. The bit-shifted value from accumulator 550, ae/b, is then provided at the output of shift register 560. This value is input to subtraction block 570, which also receives the current number of commands, i, issued from the processor from counter 530. Subtraction block 570 subtracts the output of shift register 560 from the output of counter 530 and provides the result, which is the evaluation of the expression i−ae/b.

It should be noted that the logic circuit depicted in FIG. 5 is reset at the beginning of each base period. When the logic circuit is reset, counter 530 and accumulator 550 are set to 0. Registers 510 and 520 maintain the currently held start values for the base and rate counters, respectively, through a reset.

The start values stored in registers 510 and 520 may, however, be modified from time to time as described above. Preferably, modification of the start values in registers 510 and 520 will be modified at the same time the logic circuit is reset.

While the disclosure of the present application discusses the invention in the context of computer systems that are optimized for multimedia game applications, it should be noted that the invention is more widely applicable and can be used in a variety of other contexts. Consequently, the disclosure should not be considered as limiting the invention to the field of multimedia game systems.

"Computer" and "computer system," as used herein, are intended to include any type of data processing system capable of performing the functions described herein. "Computer-readable media," as used herein, refers to any medium that can store program instructions that can be executed by a computer, and includes floppy disks, hard disk drives, CD-ROMs, DVD-ROMs, RAM, ROM, DASD arrays, magnetic tapes, floppy diskettes, optical storage devices and the like.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Those of skill in the art may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with general purpose processors, digital signal processors (DSPs), application specific integrated circuits (ASICs), field programmable gate arrays (FPGAs) or other programmable logic devices, discrete gates or transistor logic, discrete hardware components, or any combination thereof designed to perform the functions described herein. A general purpose processor may be any conventional processor, controller, microcontroller, state machine or the like. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms 'comprises,' 'comprising,' or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A method for controlling access by a plurality of agents to a resource comprising:

for each of a plurality of agents, identifying a priority associated with the agent;

enabling each agent to access a resource according to the priority associated with the agent, wherein the agents comprise processors in a multiprocessor computing system, wherein the resource comprises a bus interconnecting the processors, and wherein the enabling further comprises defining a set of time slots and assigning the processors to the time slots according to a pattern based upon the priority associated with each processor; and for each processor: determining whether an actual number of accesses by the processor to the bus is greater than or less than an expected number of accesses by the processor to the bus; and decreasing the priority associated with the processor if the actual number of accesses is greater than the expected number of accesses, and increasing the priority associated with the processor if the actual number of accesses is less than the expected number of accesses.

2. The method of claim 1, further comprising modifying the pattern based upon changes in the priorities associated with the processors.

3. The method of claim 1, wherein determining whether an actual number of accesses by the processor to the bus is greater than or less than an expected number of accesses by the processor to the bus comprises:

each time a command is issued to the processor bus, incrementing an issued command counter value, i;

each time a command is issued from the processor to the processor bus, incrementing an accumulator value by a rate counter start value, a;

shifting the accumulator value by a number of bits equal to a base counter value, b; and subtracting the shifted accumulator value from the issued command counter value to produce a value equal to the actual number of accesses by the processor to the bus minus the expected number of accesses by the processor to the bus.

4. The method of claim 1, further comprising: maintaining at least one base counter configured to decrement from a base counter start value based upon accesses to the resource; maintaining for each agent a rate counter configured to decrement from a rate counter start value based upon accesses by the agent; allowing each agent to access the resource only if the corresponding rate counter is non-zero.

5. The method of claim 1, wherein the priority associated with each agent is initially set to a value proportional to a bandwidth request associated with the agent.

6. The method of claim 1, further comprising modifying the priorities associated with one or more of the agents.

7. The method of claim 6, further comprising, for one or more of the agents, determining whether an actual number of accesses by the agent to the resource is greater than or less than an expected number of accesses by the agent to the resource.

8. The method of claim 7, wherein modifying the priorities associated with one or more of the agents comprises, for each of the one or more agents, decreasing the priority associated with the agent if the actual number of accesses is greater than the expected number of accesses and increasing the priority associated with the agent if the actual number of accesses is less than the expected number of accesses.

9. The method of claim 1, wherein the agents comprise processors in a multiprocessor computing system; and wherein the resource comprises a bus interconnecting the processors.

10. The method of claim 1, wherein enabling the agents to access the resource comprises defining a set of time slots and assigning the agents to the time slots according to a pattern based upon the priorities associated with the agents.

11. A system comprising:
    logic configured to be coupled to a resource;
    wherein the logic is configured to identify a priority for each of a plurality of agents, and, for each agent, enable access to the resource in accordance with the corresponding priority;
    wherein the agents comprise processors in a multiprocessor computing system;
    wherein the resource comprises a bus to which the processors are coupled;
    wherein the logic is configured to enable access to the bus by defining a set of time slots and assigning the processors to the time slots according to a repeating pattern based upon the priorities associated with the processors; and
    wherein the logic is configured to: determine for each processor whether an actual number of accesses by the processor to the bus is greater than or less than an expected number of accesses by the processor to the bus; and decrease the priority associated with the processor if the actual number of accesses is greater than the expected number of accesses, and increase the priority associated with the processor if the actual number of accesses is less than the expected number of accesses.

12. The system of claim 11, wherein the logic is further configured to modify the pattern based upon changes in the priorities associated with the processors.

13. The system of claim 11, wherein the logic is configured to determine for each processor whether an actual number of accesses by the processor to the bus is greater than or less than an expected number of accesses by the processor to the bus by:
    each time a command is issued to the processor bus, incrementing an issued command counter value, i;
    each time a command is issued from the processor to the processor bus, incrementing an accumulator value by a rate counter start value, a;
    shifting the accumulator value by a number of bits equal to a base counter value, b; and
    subtracting the shifted accumulator value from the issued command counter value to produce a value equal to the actual number of accesses by the processor to the bus minus the expected number of accesses by the processor to the bus.

14. The system of claim 11, further comprising: at least one base counter configured to decrement from a base counter start value based upon accesses to the resource; and a rate counter for each agent configured to decrement from a rate counter start value based upon accesses by the agent.

15. The system of claim 14, wherein the logic is configured to allowing each agent to access the resource only if the corresponding rate counter is non-zero.

16. The system of claim 11, wherein the priority associated with each agent is initially set to a value proportional to a bandwidth request associated with the agent.

17. The system of claim 11, wherein the logic is configured to modify the priorities associated with one or more of the agents.

18. The system of claim 17, wherein the logic is configured to, for one or more of the agents, determine whether an actual number of accesses by the agent to the resource is greater than or less than an expected number of accesses by the agent to the resource.

19. The system of claim 18, wherein the logic is configured to, for each of the one or more agents, decrease the priority associated with the agent if the actual number of accesses is greater than the expected number of accesses and increase the priority associated with the agent if the actual number of accesses is less than the expected number of accesses.

20. The system of claim 11, wherein the agents comprise processors in a multiprocessor computing system; and wherein the resource comprises a bus interconnecting the processors.

21. The system of claim 11, wherein the logic is configured to define a set of time slots and assign the agents to the time slots according to a repeating pattern based upon the priorities associated with the agents.

22. A software product comprising a computer readable medium containing one or more instructions configured to cause a computer to perform a method, the method comprising:
    for each of a plurality of agents identifying a priority associated with the agent;
    enabling each agent to access a resource according to the priority associated with the agent, wherein the agents comprise processors in a multiprocessor computing system, wherein the resource comprises a bus interconnecting the processors, and wherein the enabling further comprises defining a set of time slots and assigning the processors to the time slots according to a repeating pattern based upon the priorities associated with the processors; and
    further comprising, for each processor: determining whether an actual number of accesses by the processor to the bus is greater than or less than an expected number of accesses by the processor to the bus; and decreasing the priority associated with the processor if the actual number of accesses is greater than the expected number of accesses, and increasing the priority associated with the processor if the actual number of accesses is less than the expected number of accesses.

23. The software product of claim 22, further comprising modifying the pattern based upon changes in the priorities associated with the processors.

24. The software product of claim 22, wherein the software product is configured to determine whether an actual number of accesses by the processor to the bus is greater than or less than an expected number of accesses by the processor to the bus by:
    each time a command is issued to the processor bus, incrementing an issued command counter value, i;
    each time a command is issued from the processor to the processor bus, incrementing an accumulator value by a rate counter start value, a;
    shifting the accumulator value by a number of bits equal to a base counter value, b; and
    subtracting the shifted accumulator value from the issued command counter value to produce a value equal to the actual number of accesses by the processor to the bus minus the expected number of accesses by the processor to the bus.

25. The software product of claim 22, further comprising:
    maintaining at least one base counter configured to decrement from a base counter start value based upon accesses to the resource; maintaining for each agent a rate counter configured to decrement from a rate counter start value based upon accesses by the agent;

allowing each agent to access the resource only if the corresponding rate counter is non-zero.

26. The software product of claim 22, wherein the priority associated with each agent is initially set to a value proportional to a bandwidth request associated with the agent.

27. The software product of claim 22, further comprising modifying the priorities associated with one or more of the agents.

28. The software product of claim 27, further comprising, for one or more of the agents, determining whether an actual number of accesses by the agent to the resource is greater than or less than an expected number of accesses by the agent to the resource.

29. The software product of claim 28, wherein modifying the priorities associated with one or more of the agents comprises, for each of the one or more agents, decreasing the priority associated with the agent if the actual number of accesses is greater than the expected number of accesses and increasing the priority associated with the agent if the actual number of accesses is less than the expected number of accesses.

30. The software product of claim 22, wherein the agents comprise processors in a multiprocessor computing system; and wherein the resource comprises a bus interconnecting the processors.

31. The software product of claim 22, wherein enabling the agents to access the resource comprises defining a set of time slots and assigning the agents to the time slots according to a repeating pattern based upon the priorities associated with the agents.

* * * * *